United States Patent [19]

Smith

[11] 4,191,678

[45] Mar. 4, 1980

[54] FIRE RETARDANT POLYESTER-POLYTETRAFLUOROETHYLENE COMPOSITIONS

[75] Inventor: Clive P. Smith, Wheathampstead, England

[73] Assignee: Imperial Chemical Industries Limited, Great Britain

[21] Appl. No.: 827,337

[22] Filed: Aug. 24, 1977

Related U.S. Application Data

[63] Continuation of Ser. No. 668,689, Mar. 19, 1976, abandoned.

[30] Foreign Application Priority Data

Apr. 10, 1975 [GB] United Kingdom ............... 14792/75

[51] Int. Cl.$^2$ .................... C08L 67/06; C08L 67/00
[52] U.S. Cl. ........................... 260/40 R; 260/29.2 E;
260/29.6 F; 260/42.18; 260/42.27; 260/42.49;
260/48.75; 260/45.7 RT; 260/45.7 R;
260/45.75 B
[58] Field of Search ............... 260/29.2 E, 873, 40 R,
260/45.7 S, 45.7 RT, 45 RR, 45.75 B, 29.6 F

[56] References Cited

U.S. PATENT DOCUMENTS

3,294,871  12/1966  Schmitt et al. .................. 260/900
3,723,373  3/1973   Lucas ............................. 260/29.6 F

FOREIGN PATENT DOCUMENTS

1360121  7/1974  United Kingdom .

OTHER PUBLICATIONS

Pvc Technology, Penn, 3ed (Wiley 1971), pp. 285-286.
Penn, GRP Technology (Maclaren, 1966), p. 174.
Lyons, The Chemistry and Uses of Fire Retardants (Wiley, 1970), pp. 370-398.

Primary Examiner—Richard B. Turer
Attorney, Agent, or Firm—Cushman, Darby & Cushman

[57] ABSTRACT

A method for the production of thermoplastic polyester compositions comprising mixing a normally flammable thermoplastic polyester, preferably containing at least 80% by weight of repeating units of ethylene terephthalate, tetramethylene, terephthalate or ethylene-1:2-diphenoxyethane-4,4'-dicarboxylate units, an effective amount of fire-retardant additives and an aqueous colloidal dispersion of PTFE, subjecting the mixture to conditions under which the polyester becomes molten and removing volatile materials from the melt.

11 Claims, No Drawings

FIRE RETARDANT POLYESTER-POLYTETRAFLUOROETHYLENE COMPOSITIONS

This is a continuation, of application Ser. No. 668,689 filed Mar. 19, 1976, now abandoned.

This invention relates to fire-retardant thermoplastic polyester compositions and more particularly to compositions based on polyesters in which at least 80% by weight of the polymerised units are tetramethylene terephthalate units.

The use of thermoplastic polyesters such as poly(ethylene terephthalate) and poly(methylene terephthalate) as materials for engineering applications is increasing rapidly. These applications frequently require that the materials used should be self-extinguishing. In addition to being self-extinguishing the materials should be resistant to dripping so that any tendency for burning particles to drip and spread the fire risk is reduced as far as possible. A variety of tests are available for assessing the burning performance of such materials, the Underwriters Laboratories Bulletin No. 94 being particularly suitable as it takes account of both flammability and dripping characteristics.

British patent specification No. 1,360,121 describes glass-filled, fire-retardant thermoplastic polyester compositions in which a poly(tetrafluoroethylene) resin, is used to render the compositions non-dripping as assessed by the Underwriters Laboratories Bulletin No. 94 using specimens ⅛" thick. This specification states that degradation occurs, resulting in a deterioration in physical properties of the composition if the ingredients of the composition are not thoroughly dried before compounding. It has now been found that aqueous dispersions of PTFE resins may be compounded with polyesters without any substantial reduction in the physical properties of the polyester. Moreover, the amount of PTFE resin in the form of an aqueous colloidal dispersion form needed to obtain a satisfactory performance in the Underwriters Laboratories Test may be considerably reduced from the preferred range stated in British patent specification No. 1,360,121.

Accordingly there is provided a method of producing a thermoplastic polyester composition comprising intimately blending a normally flammable thermoplastic polyester, an effective amount of fire-retardant additives and poly(tetrafluoroethylene) in the form of an aqueous colloidal dispersion, subjecting the mixture to conditions under which the polyester becomes molten and removing volatile materials from the melt.

Using the method of the invention compositions can be produced which exhibit markedly improved resistance to dripping under burning conditions. Thus whereas commercially available glass-filled thermoplastic polyester compositions containing about 30% glass and sufficient fire-retardant additives to make them self-extinguishing are normally classified as non-dripping when tested on ⅛" thick samples using the Underwriters Laboratories UL94 test the inclusion of 0.1% by weight of PTFE added in the form of an aqueous dispersion by the method of the invention improves the non-dripping characteristics of the composition so that samples are classified as non-dripping by this standard test when tested at thicknesses as low as 1/32". On the more severe tests such as the CEE 10 test of the International Commission and Rules for the Approval of Electrical Equipment higher levels of aqueous PTFE dispersion are required to give a non-dripping performance but nevertheless this test also demonstrates that lower levels of aqueous PTFE improve the dripping performance by comparison with samples not containing the aqueous PTFE.

The blending operation may be carried out in any mixing apparatus in which the temperature of the mixture is raised to melt the polyester and which is provided with agitation means for intimately blending the ingredient of the composition.

The ingredients of the composition may be mixed together, for example by tumbling prior to feeding the mixture to the mixing apparatus or the ingredients may be added in turn to the mixing apparatus. A suitable method of compounding is by use of a single or double screw extruder. The mixture of ingredients may be added to the feed pocket of such an extruder or alternatively the polyester, optionally containing any of the ingredients may be fed to the extruder and the remaining ingredients fed to the molten polyester via a pocket situated in a melt zone of the barrel.

The intimately mixed composition in the extruder is normally passed through an exit die to provide laces which may be cooled in water and chopped into granules. Preferably, the extruder should be provided with a port in the barrel of the extruder for removing volatiles from the composition whilst molten. If volatiles such as water are not removed during passage through the extruder they will escape on passing through the exit die but the lace is then likely to contain many voids resulting in granules of low bulk density. The factors governing the selection of a suitable extruder are well known to those familiar with thermoplastics compounding but basically should be chosen to give intimate mixing without a substantial risk of degradation through excessive mechanical shear and overheating. It is an advantage of the method of the invention that the aqueous dispersions of PTFE may be much more easily dispersed than the solid PTFE resins used in British Patent specification No. 1,360,121 so that the choice of apparatus for intimately blending the ingredients is much less critical.

The aqueous dispersion of PTFE may be produced by the methods known in the art for polymerising the gaseous tetrafluoroethylene monomer in an aqueous medium containing water soluble free radical catalysts and a surfactant to maintain the polymerised tetrafluoroethylene as a colloidal dispersion. Methods of preparing such dispersions are described in British Patent specification No. 689,400 and British Patent specification No. 821,353. The polymerised dispersions may contain up to about 40% by weight of polymer. The surfactant used should be one which does not inhibit or seriously retard the polymerisation and is preferably a fully fluorinated surfactant such as a fully fluorinated carboxylic or sulphonic acid containing about 6 to 10 carbon atoms. The dispersions obtained from the polymerisation process are not very stable to mechanical shear in the presence of air and may be further stabilised by the addition of additional surfactants. This additional stabilisation may be effected by the use of the conventional stabilisers, particularly the non-ionic surfactants based on ethylene oxide condensates. The conventional stabilisers are very much cheaper than the fluorinated materials. The post-stabilised forms of dispersions may be concentrated by electrodecantation or evaporation to give dispersions containing up to about 65% of polymer. The ex-autoclave dispersions, post-stabilised dispersions and concentrated dispersions are commercially available. For example, the concentrated dispersion 'Fluon' GPI is available from Imperial Chemical Industries Limited. An unstabilised ex-autoclave variant 'Teflon' 42 is available from DuPont.

The polyesters suitable for use in the invention are linear thermoplastic polyesters derived from saturated aromatic dicarboxylic acids or their derivatives, such a terephthalic acid or 1,2-bis(4-carboxyphenoxy)ethane, and dihydric alcohols containing from 2 to 10 carbon atoms such as ethylene glycol, 1,3-propanediol and 1,4-butanediol. The polyesters may contain more than one dicarboxylic acid or dihydric alcohol. Preferred polyesters for moulding applications are those containing at least 80% by weight of repeating units selected from ethylene terephthalate, tetramethylene terephthalate or ethylene-1:2-diphenoxyethane-4,4'-dicarboxylic units. Mixtures of polyesters may usefully be employed.

The fire retardant materials suitable for imparting non-burning characteristics to the compositions may be chosen from a wide variety of compounds which derive their effectiveness from the presence of a substantial proportion of elements such as halogen and phosphorus in the compound. Halogen-containing organic compounds are particularly effective with polyesters, especially those compounds containing substantial proportions of bromine. Preferred compounds are those of the formula

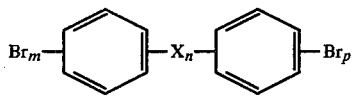

where X may be —O—, —S—, —SO—, —SO$_2$—and —CH$_2$—, n may be 0 or 1 and each of m and p may be from 1 to 5.

The fire retardant additive will normally be effective at a concentration between 3 and 25% by weight of the polyester although the preferred range is 5 to 15%.

When the fire retardant used is a halogenated material its efficiency can be improved by the addition of the Group Vb metal oxides, arsenic, antimony and bismuth oxides, particularly antimony oxide. These are normally included at concentrations of 2% to 10% by weight of the polyester. It is preferred that the weight ratio of halogen to Group Vb metal should be between 0.5:1 to 4:1.

Some fire retardant systems may have a degradative effect on the polyester of the invention during compounding and subsequent processing and it is advisable to evaluate each fire retardant system chosen in the composition of the invention to make sure that the level of degradation is acceptable.

A particularly useful range of compositions may be produced by the inclusion of a variety of reinforcing agents at concentrations from 2 to 80%, preferably 5 to 60% by weight of the total composition.

By "reinforcing agent" is meant any material which will increase the tensile strength of articles formed from compositions containing the agent. Tensile strength is conveniently assessed by the method of ASTM D 638-58T using a pulling rate of 25 mm/min. Typical reinforcing agents are fibrous materials such as glass-fibre, asbestos, carbon fibre and textile fibres.

The most useful of these because of their effectiveness, cheapness and low toxicity are glass fibres. A very large number of types of glass fibre are commercially available but these differ appreciably in their effectiveness when used in a particular thermoplastic and where a high level of tensile strength and other physical properties is an important requirement the glass type should be chosen which is suitable for use with the polyester of the composition. The difference in behaviour is normally attributable to the size used for treating the glass. The suitability of a particular type of glass may be determined by simple evaluation of test pieces of the composition or by seeking guidance from the glass fibre manufacturer.

Glass fibres are commercially available in a variety of forms including continuous roving, and chopped strand normally having average lengths of about 3 to 12 mm. The most suitable form for use in the invention is chopped strand because this can be readily tumbled with the other ingredients of the composition, separately metered to the extruder feed pocket, or fed to the molten polyester via entry pockets along the length of the extruder.

The compositions of the invention may contain a variety of other fillers, which are not normally regarded as reinforcing fillers, for the purpose of conferring various other desirable properties on the composition. For example, talc, mica and ballotini may be added in concentrations of about 5 to 50% by weight of the compositions for the purpose of improving the dimensional stability of articles made from the composition, particularly at elevated temperatures. A variety of additives may be used for improving the electrical performance of the compositions. In particular, the arc and track resistance may be improved by the inclusion of wollastonite, talc, various clays and hydrated aluminum oxide. These materials are normally included at concentrations of 5 to 60% by weight of the composition.

Other auxiliary materials such as thermal and ultraviolet stabilisers, lubricants for easier processing, nucleants, and mould release agents may also be included.

The compositions of the invention are suitable for use in a wide variety of engineering applications, particularly where the electrical properties of polyesters may be made use of.

The invention is further illustrated by the following examples.

EXAMPLE 1

3 kg lots of poly(tetramethylene terephthalate) chip (having an intrinsic viscosity of 0.95 as measured at 25° C. in a 1% by weight solution of o-chlorophenol) were blended with various proportions of a PTFE aqueous dispersion in the proportions tabulated below by tumbling the chip with the dispersion in an end-over-end tumbler for 5 minutes. 490 g of decabromo diphenyl oxide and 175 g of antimony oxide were then added and the tumbling continued for a further 5 minutes. The PTFE dispersion contained 62% by weight of PTFE having a number average particle size of about 0.2 micron. The dispersion had been prepared by polymerisation in the presence of 0.03% (based on the aqueous phase) of the ammonium salt of perfluoro octanoic acid. After polymerisation to a solids content of 18% the dispersion was first stabilised with an ethoxylate of an alkyl phenol, sold under the trade name "Triton" X100, and concentrated by electrodecantation to a solids content of about 65%. The final dispersion had a "Triton" X100 concentration of 2% by weight of the PTFE in the dispersion.

The tumble-blended mixture was fed to a 1½" vented screw extruder having a length to diameter ratio of 28:1 and the screw having a primary screw volume compression ratio of 3:1. The extruder barrel was maintained at a temperature of about 240° C. The mixture was extruded as a lace which had no significant porosity. The lace was cooled in water before being chopped into granules. The granules had a moisture content of 0.06%. The extrusion behaviour and melt flow index of each mixture is noted in the table below. The granules were moulded on a Stubbe injection moulding machine into test samples having a thickness of 1/16".

The samples were tested according to both the UL94 test and according to the more severe test described on page 23 of Section L of Publication 10 (October 1972) Part 2 of the International Commission and Rules for the Approval of Electrical Equipment (CEE 10). This test which is normally used for testing electrical components involves the application of a butane flame to the test samples for successive periods of 1 minute, 1 minute and 2 minutes. In the results below the time periods quoted in the CEE 10 are the cumulative times taken from the start of the first ignition.

| % PTFE as polymer (by weight of composition) | Extrusion Behavour | Melt Flow Index* | UL94 (1/16") | $CEE_{10}$ (1/16") |
| --- | --- | --- | --- | --- |
| 8 | Very high melt strength with no lumps of PTFE visible | not measurable | not measured | not measured |
| 4 | | 4 | VO-non-dripping | not measured |
| 0.8 | | 15 | " | Dripped on 3rd ignition after 150 sec. |
| 0.6 | No extrusion problems. | 20 | " | Dripped on 3rd ignition after 165 sec. |
| 0.4 | Lace had smooth silky finish | not measured | " | Dripped on 3rd ignition after 180 sec. |
| 0.2 | | 22 | " | Dripped on 2nd ignition after 90 sec. |
| 0.1 | | 25 | " | Dripped on 2nd ignition after 60 sec. |
| 0 | Smooth glossy lace, no extrusion problems | 28 | dripped | Dripped on 1st ignition after less than 30 sec. |

*Measured according to ASTM method 1238-62T

The compositions gave a VO performance on the UL94 test and were non-dripping down to concentrations of 0.1% by weight of PTFE as polymer. The behaviour on the more severe CEE10 test varied depending on the concentration of PTFE although dripping occurred at all concentrations up to 0.8% PTFE.

Comparative Example A

The procedure of Example 1 was repeated using 0.8% by weight of the composition of a powder form of PTFE sold by Imperial Chemical Industries Limited as 'Fluon' CD1 to replace the aqueous dispersion. During the extrusion of the mixture the extruded lace broke frequently and undispersed PTFE was observed in the lace. The extruded product was moulded into test pieces 1/16" thick as in Example 1. Undispersed 'Fluon' was still visible in the mouldings. The sample was found to be non-dripping and have a VO rating on the UL94 test, but dripped on the first ignition of the CEE10 test.

EXAMPLE 2

The procedure of Example 1 was repeated except in that the composition fed to the extruder contained 30% by weight of chopped strand glass fibre having an average length of 6 mm. The results of testing mouldings prepared as in Example 1 are recorded in Table 2.

TABLE 2

| % PTFE as polymer (by weight of composition) | Tensile strength $MN/m^2$ | Charpy Impact strength ($KJ/m^2$) | | UL94 1/16" | $CEE_{10}$ | |
| --- | --- | --- | --- | --- | --- | --- |
| | | IS(¼) | UNIS | | ⅛" | 1/16" |
| 0 | 131 | 6.8 | 39.0 | 94V-O dripped | failed on 1st ignition | failed on 1st ignition |
| 0.1 | 137 | 6.9 | 39.2 | 94V-O non-drip | pass | pass |
| 0.5 | 135 | 5.9 | 42.1 | 94V-O non-drip | pass | pass |

I claim:

1. A method of producing a thermoplastic polyester composition comprising mixing a normally flammable thermoplastic polyester, an effective amount of fire-retardant additives selected from the group consisting of compounds of the formula

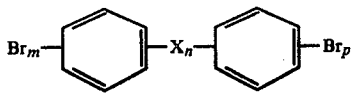

where X may be —O—, —S—, —SO—, —SO$_2$—and —CH$_2$—, n may be 0 or 1 and each of m and p may be from 1 to 5 and polytetrafluoroethylene in the form of an aqueous colloidal dispersion, subjecting the mixture to conditions under which the polyester becomes molten and removing volatile materials from the melt, so that there is produced a composition which has a rating of 94VO according to underwriter's laboratory's test standard UL94 when measured on a sample of 1/16" thickness and which is non-dripping.

2. A method according to claim 1 in which the dispersion has been stabilised after polymerisation with a non-ionic surfactant.

3. A method according to claim 1 in which the concentration of poly(tetrafluoroethylene) solids used by weight of the total composition is between 0.1 and 8.0%.

4. A method according to claim 3 in which the concentration of fire-retardant additive is between 3 and 25% by weight of the total composition.

5. A method according to claim 4 in which the fire retardant additive comprises a mixture of a halogenated fire retardant and a Group Vb metal oxide.

6. A method according to claim 1 in which the mixture includes from 2 to 80% by weight of a reinforcing filler.

7. A method according to claim 6 in which the reinforcing filler is glass fibre, asbestos, carbon fibre or textile fibres.

8. A method according to claim 1 in which from 5 to 50% by weight of the composition of a filler selected from talc, mica, ballotini, wollastonite, clays and hydrated aluminium oxide is added.

9. A method according to claim 8 in which the concentration of poly(tetrafluoroethylene) solids is from 0.1 to 1.0% by weight of the composition.

10. A method according to claim 1 in which at least 80% by weight of the repeating units of the polyester are ethylene terephthalate, tetramethylene terephthalate, or ethylene-1:2-diphenoxyethylene-4,4'-dicarboxylate units.

11. A method according to claim 1 in which the mixture is free of reinforcing filler.

* * * * *